United States Patent [19]

Fraser

[11] Patent Number: 5,306,897
[45] Date of Patent: Apr. 26, 1994

[54] HEAT TREATMENT METHOD AND APPARATUS FOR TURBINE BLADES USING FLEXIBLE HEATER SLEEVE

[75] Inventor: Michael J. Fraser, Badgeworth, United Kingdom

[73] Assignee: Turbine Blading Limited, Droitwich, United Kingdom

[21] Appl. No.: 902,659

[22] Filed: Jun. 23, 1992

[30] Foreign Application Priority Data

Jun. 25, 1991 [GB] United Kingdom ............... 9113755

[51] Int. Cl.⁵ .................. B23K 5/22; B23P 25/00; C21D 1/30; H05B 3/02
[52] U.S. Cl. .................. 219/535; 228/230; 228/232; 165/46
[58] Field of Search .............. 219/535; 228/229–232; 165/46, 64, 65, 58; 392/468; 338/214

[56] References Cited

U.S. PATENT DOCUMENTS

| | | | |
|---|---|---|---|
| 1,312,554 | 8/1919 | Logan | 219/535 |
| 1,855,092 | 4/1932 | Browne | |
| 2,403,676 | 7/1946 | Modlinski | 128/402 |
| 2,404,736 | 7/1946 | Marick | 219/535 |
| 2,482,665 | 9/1949 | Geyer | 219/535 |
| 3,036,187 | 5/1962 | Goldstaub et al. | 219/550 |
| 3,125,804 | 3/1964 | Thome | 29/487 |
| 3,132,688 | 5/1964 | Nowak | 165/64 |
| 3,393,297 | 7/1968 | Hart | 219/528 |
| 3,484,585 | 12/1969 | Morey | 219/535 |
| 4,069,410 | 1/1978 | Keep, Jr. | 219/535 |
| 4,352,707 | 10/1982 | Wengler et al. | 156/359 |
| 4,504,734 | 3/1985 | Piazzola | 219/550 |
| 4,613,744 | 9/1986 | Fraser | 219/200 |
| 5,049,724 | 9/1991 | Anderson | 219/535 |
| 5,173,585 | 12/1992 | Dokken | 219/535 |

FOREIGN PATENT DOCUMENTS 56-163091 12/1981 Japan.

Primary Examiner—Bruce A. Reynolds
Assistant Examiner—John A. Jeffery
Attorney, Agent, or Firm—Armstrong, Westerman Hattori, McLeland & Naughton

[57] ABSTRACT

Heating apparatus specifically adapted for the heat treatment of turbine blades comprises two support parts (10, 11) which may be pivotally connected by a hinge (17), the support parts (10, 11) carrying heating elements (14, 15) and a slot (20) the provision of the slot (20) enabling the heating apparatus to be slid over the trailing edge of the turbine blade into position on the blade and subsequently closed by a closure member (24) which enables the rapid application of heating apparatus for heat treatment processes which has hitherto been a complicated and time consuming operation. The heating apparatus may incorporate thermocouples (27) and heat sinks.

11 Claims, 2 Drawing Sheets

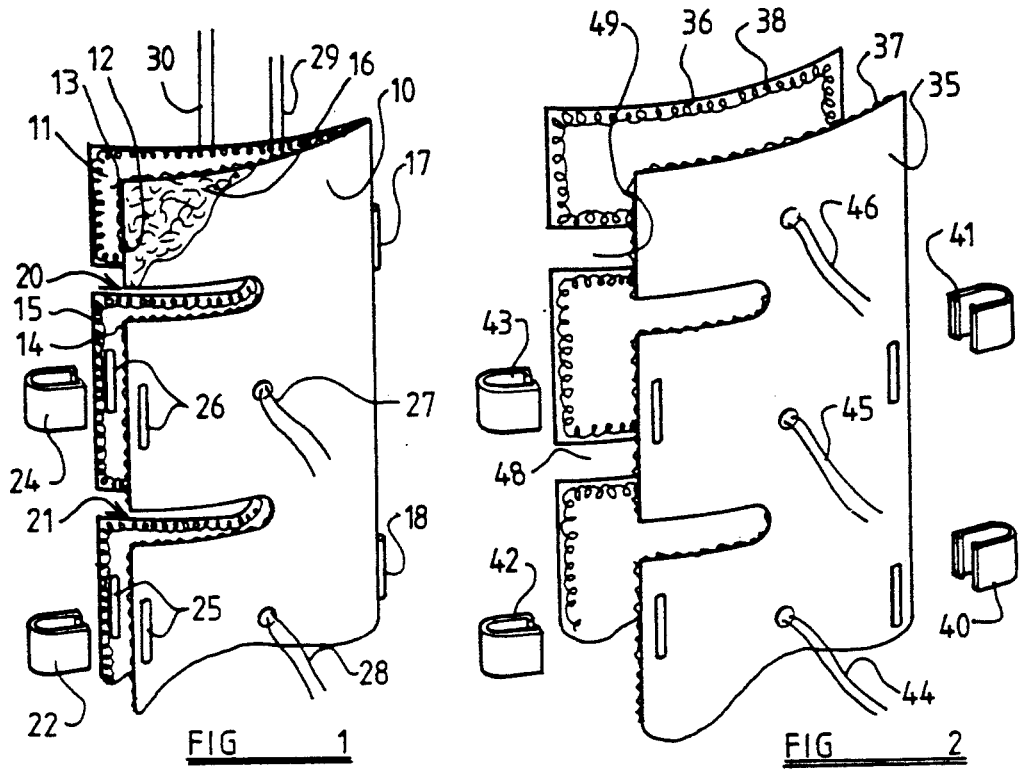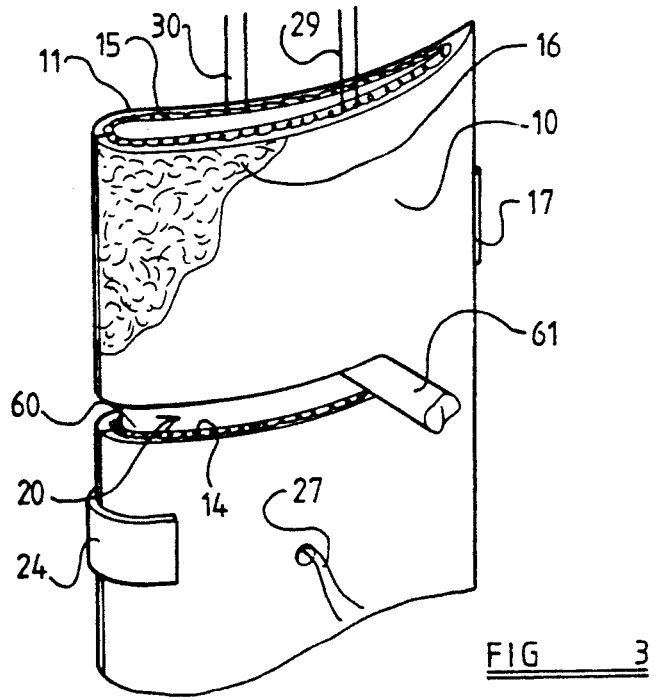

HEAT TREATMENT METHOD AND APPARATUS FOR TURBINE BLADES USING FLEXIBLE HEATER SLEEVE

BACKGROUND OF THE INVENTION

1. Field of the Invention

The present invention relates to apparatus for the heat treatment of turbine blades either before, during or after work to be carried out on the turbine blades, which work involves the input of considerable thermal energy such as may occur during a welding or brazing operation.

When work is carried out to a turbine blade, which work may comprise modification or repair for example, such work involves the application of considerable thermal energy.

Applicant has found that it is advantageous to not only provide a stress relieving heat treatment after such work has been carried out but the application of controlled heat, both before the application of considerable thermal energy and in some cases during the application of considerable thermal energy, can be beneficial to reduce stresses and/or distortion that might otherwise occur to the turbine blade.

Heat may in many instances best be applied by the application of electrically heated elements, often referred to as heating mats, since the heat dissipation of such mats and the temperature to which the turbine blade is heated may be carefully controlled by altering the power supply to individual heating mats.

2. Prior Art

Problems have occurred in the past in the securing of such mats to the turbine blades and British Patent Specification No. 2,144,361, which corresponds to U.S. Pat. No. 4,613,744, provides one solution to the problem.

The invention disclosed in British Patent Specification No. 2,144,361 involved the attachment of wires to a turbine blade, which wires may subsequently be removed, to hold the heating mats in position and also enabled a part of the heating mat to be temporarily removed from a repair area to enable a work step involving welding, for example, to be carried out as required.

The attachment of heating mats in a manner as described in British Patent Specification 2,144,361 was highly satisfactory. However, in some cases problems could occur, in particular where it was required to carry out work on the turbine blade while still in position on a rotor in view of the proximity of adjacent blades, since access to the blade to be repaired can be very limited.

It is an object of the present invention to provide heating apparatus that overcomes or reduces the problems mentioned above.

SUMMARY OF THE INVENTION

According to one aspect of the present invention we provide heating apparatus adapted for the heat treatment of turbine blades of the type having snubbers, lacing wires or other protuberances, said heating apparatus comprising:

1. a support member;
2. heating means secured to said support member;
3. the support member and the heating means being shaped to fit over at least part of the surface of a turbine blade;
4. the support member and heating means having at least one slot or cut-out to accommodate said snubber, lacing wire or other protuberance so as to enable the support member and the heating means to be placed in position on the turbine blade; and
5. fixing means for fixing the heating apparatus to the turbine blade.

Preferably said slot or cut-out extends from one edge of said support member to enable the heating apparatus to be quickly and securely positioned on a turbine blade and, depending upon the nature and position of the protuberance, said heating apparatus may be positioned on the turbine blade by approaching over the leading edge of the blade, the trailing edge or the end thereof, the slot or cut-out extending from one edge of the support member in a direction substantially parallel to the direction of movement necessary for the heating apparatus to take up its proper position on the turbine blade.

Preferably said heating apparatus comprises two support members which may be secured permanently or temporarily to each other by means permitting relative movement between the two support parts, for example a hinge arrangement or some other flexible connection and, after said heating apparatus has been positioned on the turbine blade, further securing means may be engaged so as to prevent relative pivotal movement between the two parts or other relative movement, said additional fixing means bringing the support member and heating means into juxtaposition with the turbine blade and holding it securely in such position.

Said fixing means may comprise means provided on one or both of said support parts or alternatively may comprise separate means adapted to engage both support parts.

Said heating means may comprise electrically energized heating elements and may be positioned on said support means in any desired position and may be situate on that side of the heating means whereby when said heating apparatus is applied to a turbine blade the heating means is between the support part and the turbine blade or alternatively, and where the support part is of a conductive nature, said heating means may be positioned on that side of the support means remote from the turbine blade.

Said support part may also have secured thereto insulating means so as to minimize heat loss during energization of said heating means and hence reduce the amount of energy required to bring the turbine blade up to a predetermined temperature and maintain said temperature for a predetermined desired length of time.

Said support members may also be provided with thermocouples or other temperature indicating devices and control means may be provided to control the energization of the heating means either with predetermined criteria and/or in accordance with temperatures sensed by said thermocouple, said thermocouples being connected to said control means in order to be at least partially responsible for the control of the electrical heating elements.

It is further envisaged that where said heating apparatus is provided in two or more parts, each support part may have connection means whereby they may be assembled around a turbine blade whereby the various parts may be connected together in position on a blade, the protuberance on said blade being accommodated by cut-outs or the particular shape of the support parts on which the heating means are provided.

The heating of the present invention thus provides a rapid method of installing heating apparatus on a turbine blade to effect heat treatment thereof, which heat treatment may be necessary before, during or after a work operation on the blade which work operation may, in the absence of heat treatment, result in undesired stress being imparted to the blade.

It is further envisaged that said support means may incorporate heat sinks or chills in order that while one area of the turbine blade may be heated, another part may be cooled.

In such cases, one or more support parts may be provided with a heat conductive element, for example a copper block, which copper block may also be provided with air or liquid cooling means so as to readily conduct away heat f rom a certain area of a turbine blade.

It is further envisaged that said support means may be provided with location means, for example said cut-out or slot may be adapted to locate with a specific protuberance provided on the blade or alternatively said support means may be provided itself with a protuberance adapted to locate within a hole or recess provided on the turbine blade to ensure that said heating means is properly located relative thereto.

The support means when provided with insulation means may be provided with the insulation means between the heating elements and the support means itself.

In some cases where the support means are provided in pairs, either as two hinged members or two separate members, or subsequent detachable securement to each other, only one of the support members may be provided with a heating element and if desired insulation means, and the other support element may be provided with insulation means only.

In such a case the blade to be heated may be heated from one side only and in a slow and controlled manner to ensure that the entire area to be heat treated is raised to the correct temperature and to ensure that the correct temperatures are reached, the support member without heating elements may also be provided with thermocouples which will register the temperature of the blade on the side opposite to that which is being heated. Thus, the temperature sensed by the thermocouples will be indicative that the heat has transferred from one side of the blade through the blade to the opposite side thus ensuring that the desired temperatures have been achieved.

The electrical heating elements and thermocouples may be connected to control means so that the blade heated by the heating elements can be heated in a controlled manner, suitable feed-back signals coming from the thermocouples and it is further envisaged that a sample blade which may, for example, be a blade identical to that present on the rotor may have the same work operations carried out as the repair or modification operations carried out on the blades on a rotor and may then be subsequently heat treated in a recorded manner and the blade subsequently analyzed. After analysis modifications may be made to the heat treatment program to ensure that the program provides optimum stress relief.

It is then possible with the heating means of the present invention to heat each blade after repair or modification in a manner that is known to provide a highly satisfactory stress relieving heat treatment process.

BRIEF DESCRIPTION OF THE DRAWINGS

The invention will now be described in more detail by way of example only with reference to the accompanying drawing, wherein:

FIG. 1 is a diagrammatic view of one embodiment of apparatus of the present invention;

FIG. 2 is a diagrammatic view of an alternative embodiment;

FIG. 3 shows part of the embodiment shown in FIG. 1 in place on a blade;

DESCRIPTION OF THE PREFERRED EMBODIMENTS

Figure 4:
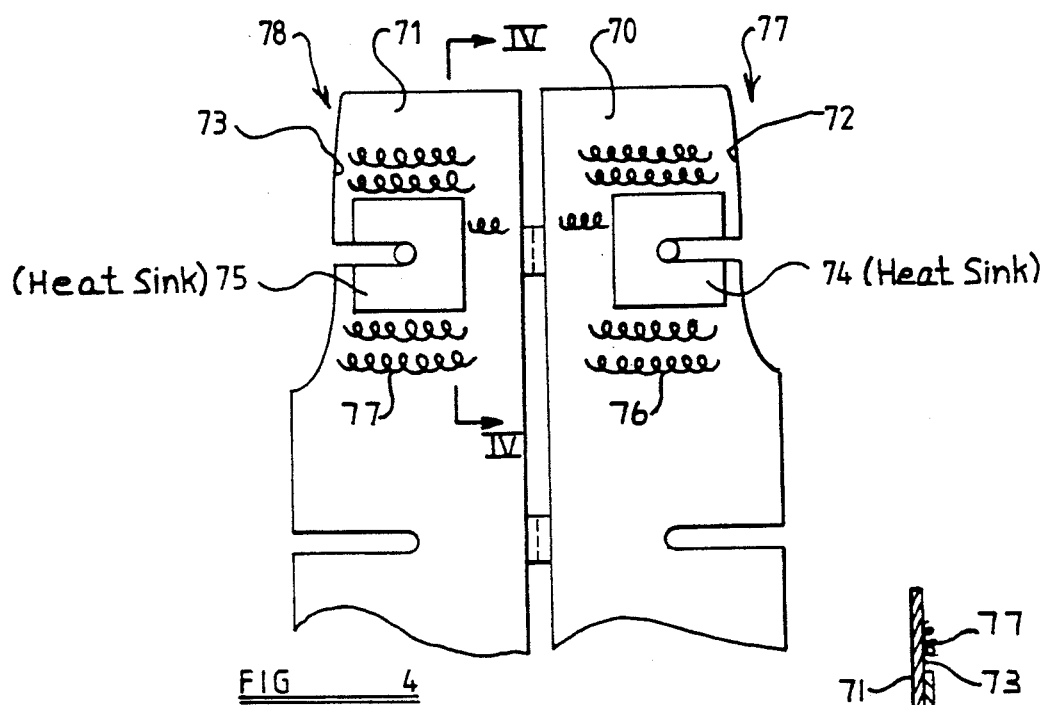
FIG. 4 is an alternative embodiment incorporating a heat chill.
Figure 4A:
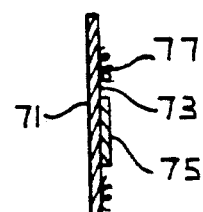
FIG. 4A is a cross-sectional view taken along lines IV—IV of FIG. 4.

Referring first to FIG. 1, the embodiment shown therein comprises a first support member 10, and a second support member 11, the respective inner sides 12 and 13 of which have secured thereto a plurality of electrical heating elements such as those shown at 14 and 15.

The heating elements are shown only at the edge regions. However, in practice they will cover a substantial part of the surface of the support members 10 and 11.

The support members 10 and 11 may be made from any suitable material providing it is capable of withstanding the heat of the heating elements 14 and 15 and is preferably made from a metallic material and may have the outer surface thereof covered with insulation material such as the wadding shown at 16.

The support members 10 and 11 are hinged together at 17 and 18 so that they may be moved away from each other and placed in position on a turbine blade by approaching the blade from the trailing edge thereof, the two slots 20 and 21 provided in both support members 10 and 11 locating around lacing wires to enable the heating apparatus to simply and quickly be properly located on a turbine blade. Once in position, retaining clips 22 and 24 are pushed into grooves 25 and 26 and the heating apparatus is then held firmly in place.

Also incorporated in the heating apparatus are thermocouples 27 and 28 and the connections to the thermocouples 27 and 28 and the power leads 29 and 30 to the heaters, and any other power leads to the heaters provided on the heating means, there may be many separate heaters, are led to control means so that the heat applied to the turbine blade and the temperature to which it is raised at various positions can be carefully monitored and kept within desired values.

An alternative embodiment is shown in FIG. 2, the two support members 35 and 36 being formed as separate components which can be advantageous when access to the blade is very difficult and it is not possible to position a hinged apparatus as shown in FIG. 1. Once the two support members 35 and 36 which carry heating elements 37 and 38, similar to the embodiment described in FIG. 1, have been placed in position on a turbine blade, retaining clips 40, 41, and 43 can be placed in position to engage the grooves or cut-outs in the support members 35 and 36 to hold the heating apparatus in place.

Thermocouples 44 to 46 are provided to give an indication of the temperature of the blade and once again the signals from the thermocouples and the power leads to the heaters may be connected to control apparatus to control the heat input and hence the temperatures to which the turbine blade is raised.

The slots 48 and 49 permit proper location of the heating apparatus on a turbine blade.

Referring to FIG. 3, a part of a heating apparatus shown in FIG. 1 is shown located on the blade 60 and it can be seen how the slot 20 permits the heating apparatus to be slid onto the blade from the trailing edge thereof so that the lacing wire 61 causes no hindrance and in fact is instrumental in properly locating the heating apparatus in its proper position. Once in position the retaining clip 24 may be placed in position to retain the heating apparatus on the blade.

Referring now to FIG. 4, an alternative embodiment is shown and there are two hinged support members 70 and 71, the inside surface of which 72 and 73 will have heaters 76, 77 connected thereto at desired positions and in the embodiment shown the support members 70 and 71 also carry a heat sink or chill in the form of copper blocks 74 and 75. The purpose of the copper blocks is to conduct heat away from a specific part of the turbine blade, in this case an area surrounding the lacing wire and such a chill may be operative to conduct heat away from the turbine blade when, for example, a repair operation is being carried out which may involve welding, in such a case a part of one of the support members may be removed or the support member may be formed with a particular shape so as to permit access to the part of the blade to be repaired. In the embodiment shown, two areas 77 and 78 are indicated which correspond to the outer part of the leading edge of the turbine blade and where damage often occurs to the turbine blade.

Since the support part and hence the heaters do not extend to that region, the heating apparatus enables heating and/or the conducting of heat away from the turbine blade while a repair operation is carried out.

If desired the chills 74 and 75 may comprise hollow blocks or have passages through to permit cooling fluid to pass therethrough to further enhance the conduction of heat away from that area of the blade.

Figure 5:
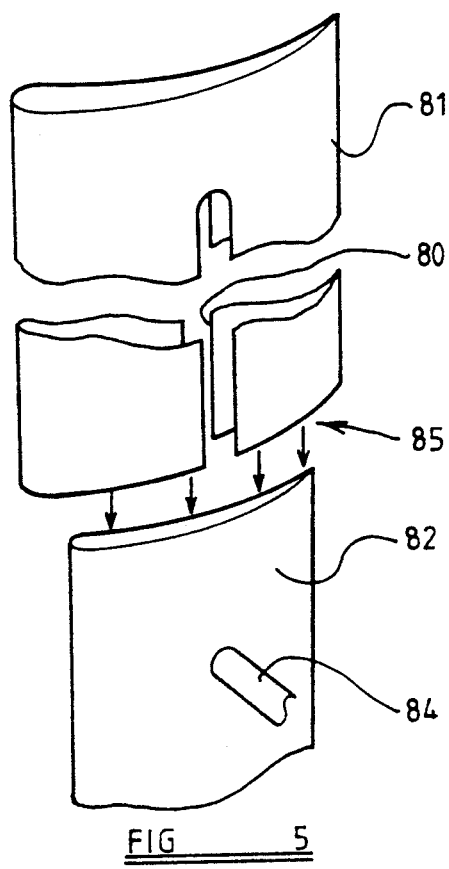
FIG. 5 shows still further embodiment adapted to be fitted onto a turbine blade from the end.

Referring now in addition to FIG. 5, a further embodiment of heating means is shown, the figure showing only the support part. However, heating means and if desired insulation means and thermocouples etc., may be secured to the heating apparatus in precisely the same manner as described in connection with the other embodiments.

In the embodiment shown a slot 80 is provided in the support member 81, the slot 80 extending longitudinally of the support member 81 so as to permit the positioning of the heating apparatus on a blade 82 in a direction as indicated by arrows 85, i.e. incorporating a movement parallel to the longitudinal axis of the blade 82.

The lacing wire 84 will be accommodated by the slot 80 enabling the support member 81 together with heating apparatus connected thereto to take up its proper position on the blade 82.

Figure 6:
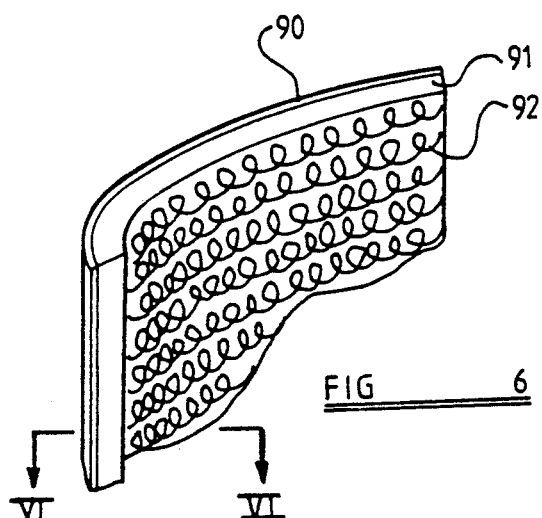
FIG. 6 shows a portion of a support member with heating and heat insulation means.
Figure 6A:
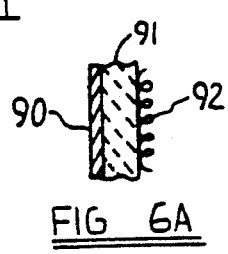
FIG. 6A is a cross-sectional view taken along lines VI—VI of FIG. 6.

Referring now to FIG. 6, a part of heating apparatus is shown, the heating apparatus comprising a support member 90 having the inside surface thereof provided with insulation material 91 which may be any suitable heat insulation material such as a glass or other fibrous material and the heating elements 92 are situate on the internal surface of the insulation material 91.

The other part of the support member (not shown) which may be detachably connected to the part of the support member 90 shown in FIG. 6, or may be hinged thereto, may be similar in construction or alternatively may be provided without heating elements where it is desired or there is room only to accommodate heaters on one side of the blade.

The support member on the other side of the blade may therefore be made from a very thin material so that there is sufficient space for the positioning of a support member bearing heating elements to heat another turbine blade adjacent thereto.

Such an embodiment of heating apparatus is of particular use where access to individual blades is difficult due to the proximity of other blades and the only way in which heating apparatus can be properly applied is by approaching each blade with the required heating means from the outer end thereof.

Whereas the above embodiments have been described having heating elements attached to the inner surface thereon, it is envisaged, particularly where the support members are made from a conductive material, that the heating means may be on the outer surface and insulation means may be provided situated outwardly from the heating elements.

The support members may be provided with any number of thermocouples and different heating elements to enable the heating of different parts of the blade to different temperatures to create, if desired, deliberate temperature gradients across surface parts of the blade, the thermocouples enabling accurate information concerning the temperature of the blade to be fed back to control means which may in turn be operated in accordance with a desired program and/or signals received from the thermocouples to control the supply of energy to the various heating means.

The features disclosed in the foregoing description, or the following claims, or the accompanying drawings, expressed in their specific forms or in the terms or means for performing the desired function, or a method or process for attaining the disclosed result, may, separately or in any combination of such features, be utilized for realizing the invention in diverse forms thereof.

What is claimed is:

1. A method of providing stress relieving heat treatment to a turbine blade of the type having snubbers, lacing wires or other protuberances, upon which a welding or brazing operation is carried out comprising:
   (a) securing on said blade a heating apparatus comprising:
      at least one support member;
      heating means secured to an inside surface of said support member, said support member of a material sufficient to withstand temperatures of said welding or brazing;
      the support member and the heating means being shaped to fit over at least part of the surface of a turbine blade;
      the support member and heating means having at least one slot or cut-out extending from an edge of the support member to accommodate said snubber, lacing wire or other protuberance so as to enable the support member and the heating means to be placed in position on the turbine blade; and securing means for securing the heating apparatus to the turbine blade; and (b) supplying energy to said heating means.

2. The method according to claim 1 wherein two support members are provided, including placing one support member in juxtaposition with one side of the blade and the other on the other side of the blade and securing said support members together when in position on the blade to secure the heating apparatus to the blade.

3. The method according to claim 2 including the step of providing a heat sink or chill on said inside surface to enable one area of the turbine blade to be heated while another area is cooled.

4. The method according to claim 3 wherein said heat sink or chill is provided with a heat conductive part and passing a heat conducting fluid therethrough.

5. The method according to claim 2 including shaping at least one of said support members in a manner to leave a portion of said turbine blade uncovered by said heating means to enable a work operation to be carried out on that part of the blade while said heating apparatus is in position thereon.

6. The method according to claim 2 including connecting said support members to each other at least along one edge thereof by flexible means.

7. The method according to claim 1 wherein said support members are connected to each other at least along one edge thereof by hinge means.

8. The method according to claim 1 wherein said heating means comprises electrically energized heating elements, and said energy supplied is electrical energy.

9. The method according to claim 8 wherein said electrically energized heating elements are secured to one side of the support member so that in use of the apparatus the heating elements are positioned between the turbine blade and the support means.

10. The method according to claim 1 including the step of providing insulating means on said support member on the opposite side of said heating element to the turbine blade when said heating apparatus is in use.

11. A method of providing a stress relieving heat treatment to a turbine blade according to claim 1 wherein electrical heating elements are provided and said support members are provided with thermocouples and wherein the electrical heating elements and thermocouples are connected to control apparatus, said control apparatus is operated so that the turbine blade heated by the heating elements is heated in a controlled manner, and feed back signals provided from said thermocouples are used to influence the energy supplied to said electrical heating elements to cause the blade to be heated in a controlled manner in accordance with predetermined desired criteria.

* * * * *